O. F. MORRILL.
FAUCET.
No. 60,223.
Patented Dec. 4, 1866.
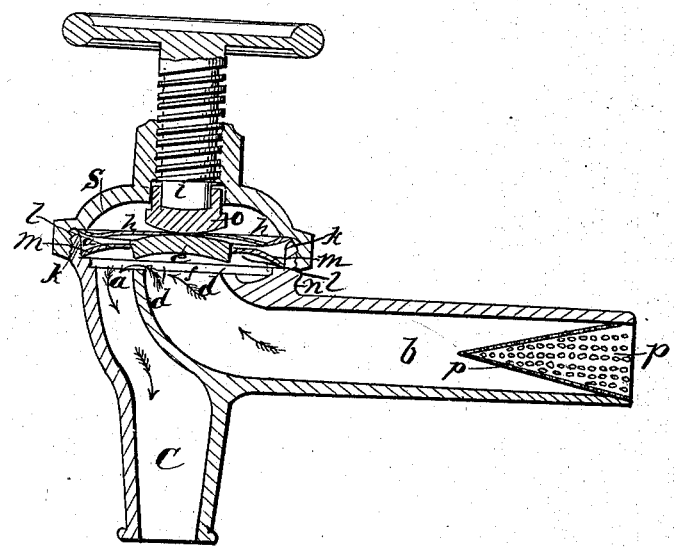
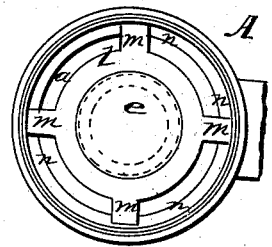

United States Patent Office.

IMPROVEMENT IN FAUCETS.

OSCAR F. MORRILL, OF CHELSEA, MASSACHUSETTS.

Letters Patent No. 60,223, dated December 4, 1866; antedated November 21, 1866.

SPECIFICATION

TO ALL WHOM IT MAY CONCERN:

Be it known that I, OSCAR F. MORRILL, of Chelsea, in the county of Suffolk, and State of Massachusetts have invented an improved Faucet; and I do hereby declare that the following, taken in connection with the drawings which accompany and form part of this specification, is a description of my invention sufficient to enable those skilled in the art to practise it.

The invention relates to the construction and arrangement of parts of metallic faucets, and particularly to that class of faucets used for drawing oil.

The improvement consists in the employment of a metallic diaphragm packing, extending across the top of the faucet chamber, and held down over the mouth of said chamber by the screw-cap. Also, in the employment in the faucet chamber of a metallic valve held above the valve-seat by a metallic spring, and forced down against the same by the pressure of a screw-plug or follower, exerted against the diaphragm, and by the diaphragm against the valve.

The drawing represents a central section of a faucet embodying the invention. $a$ denotes the main chamber; $b$ the induction pipe leading into, and $c$ the eduction pipe leading from, said chamber; $d$ is the valve-seat, and $e$ the valve, through which communication between the induction and eduction pipes is controlled. The lower face of this valve is made dishing or concave, so as to make a sharp edge, $f$, which by pressure against the flat surface of the valve-seat shall grind or press into said surface and make a perfectly tight joint, the edge cutting through any such slight substance as may enter the chamber and come under the valve.

In faucets of ordinary construction, where a packing is used, it is found impossible, in employing them for certain kinds of liquid, to make the valve perfectly tight, as the liquid will dissolve or permeate through the packing, however tightly it may be compressed; and the same is true where a flat-surfaced valve impinges against a flat-surfaced valve-seat, any fine sediment or foreign matter coming between the surfaces making the joint pervious to the fluid. I therefore dispense with the common packing and bring the valve to an edge, as described. And to prevent the escape of the liquid through the screw joint made by the cap, $g$, and through the packing ordinarily employed in connection therewith, I employ the diaphragm, $h$, made independent of the follower, $i$, and the valve, $d$, and extending, at its edge, over a sharp edge, $k$, made on the top of the chamber, $a$, the cap, $g$, screwing down upon the diaphragm and pressing the edge, $k$, into the diaphragm, making the joint between the cap and chamber perfectly tight, and thereby preventing all escape of the liquid by the threads of the cap-screw or the threads of the screw-follower, $i$. Instead of making the sharp edge on the valve and the flat surface on its seat, the reverse may be the construction, the valve having the flat surface and the seat the edge. And so with the cap; it may have the sharp edge, and the top of the chamber, $a$, the flat surface; but I consider the construction shown to be most practicable. The valve is shown in the drawing as raised from its seat, it being brought to this position (when the follower is raised) by a spring or lifter, $l$, which has a central hole, into which the valve fits, (the valve having a flange which rests upon the spring,) and projections or legs, $m$, which rest upon a seat, $n$, made around the valve chamber, as seen at A, (which shows a top view of the faucet chamber, the valve, and the spring or lifter, $l$.) The legs or projections, $m$, serve to centralize the valve and bring it properly into position on its seat, when pressed down by the follower. The follower is provided with a shoe, $o$, at its lower end, the lower face of which is made slightly convex, as seen in the drawing. The end of the follower enters this shoe, and the diaphragm is held up in contact with it by its own spring, and the spring of the lifter, $l$, which holds the valve up to the diaphragm. The follower turns freely in the shoe without rotating it, and when the follower is screwed down it presses down the diaphragm, and the diaphragm the valve, until the latter is brought firmly upon its seat, the upper surface of the valve being made crowning, so that the pressure all around the edge of the valve is the same.

Where for various purposes metallic diaphragms have heretofore been extended across the chambers of cocks or faucets, the practice is, so far as I know, to attach the diaphragm to the valve by a stem, but I have found that in a faucet that is used continually, the diaphragm soon breaks away at the stem which connects it with the valve; I therefore make the diaphragm independent of the valve, and to prevent wear by the grinding or friction of the end of the follower upon its surface, I employ the shoe, which simply presses against and communicates motion to the diaphragm without rotating against the same.

Strainers are sometimes placed over the induction orifices of faucets, but the area of the straining surface is so small that the holes soon become obstructed. To increase the straining area, I place a conical or tapering strainer, $p$, just within the mouth of the induction pipe, as seen in the drawing. This enables the induction orifice to be kept free for a long time, while it prevents the entrance of foreign matters which might tend to obstruct the valve in the chamber, $a$.

I claim, in combination with the metal valve $e$, the metal diaphragm packing $h$, extending over the faucet chamber, and held down by the screw-cap $g$, substantially as described.

Also, in combination with the diaphragm $h$, and valve $e$, the spring-lifter $l$, operating to raise the valve from its seat as the follower is unscrewed, said spring being provided with legs or projections which serve to keep the valve in central position with respect to its seat, substantially as described.

Also, the relative arrangement of the valve $e$, diaphragm $h$, spring $l$, shoe $o$, and follower $i$, to effect the raising of the valve from its seat, and its closing thereupon, substantially as set forth.

OSCAR F. MORRILL.

Witnesses:
    F. GOULD,
    J. B. CROSBY.